United States Patent
Vissing et al.

(10) Patent No.: US 12,219,955 B2
(45) Date of Patent: Feb. 11, 2025

(54) ANTIMICROBIAL LAYERED MATERIAL

(71) Applicants: Fraunhofer-Gesellschaft zur Förderung der angewandten Forschung e.V., Munich (DE); Bio-Gate AG, Nuremberg (DE)

(72) Inventors: Klaus-Dieter Vissing, Bremen (DE); Dirk Salz, Bremen (DE); Peter Steinrücke, Nuremberg (DE)

(73) Assignees: Fraunhofer-Gesellschaft zur Förderung der angewandten Forschung e.V., Munich (DE); Bio-Gate AG, Nuremberg (DE)

( * ) Notice: Subject to any disclaimer, the term of this patent is extended or adjusted under 35 U.S.C. 154(b) by 309 days.

(21) Appl. No.: 16/954,402

(22) PCT Filed: Dec. 18, 2018

(86) PCT No.: PCT/EP2018/085470
§ 371 (c)(1),
(2) Date: Jun. 16, 2020

(87) PCT Pub. No.: WO2019/121667
PCT Pub. Date: Jun. 27, 2019

(65) Prior Publication Data
US 2021/0078311 A1 Mar. 18, 2021

(30) Foreign Application Priority Data
Dec. 19, 2017 (DE) ...................... 10 2017 130 600.5

(51) Int. Cl.
*B32B 27/14* (2006.01)
*A01N 25/34* (2006.01)
*A01N 59/16* (2006.01)
*A01N 59/20* (2006.01)

(52) U.S. Cl.
CPC ............. *A01N 25/34* (2013.01); *A01N 59/16* (2013.01); *A01N 59/20* (2013.01)

(58) Field of Classification Search
CPC ........ A01N 25/34; A01N 59/16; A01N 59/20; A61L 2300/104
See application file for complete search history.

(56) References Cited

U.S. PATENT DOCUMENTS

2009/0035341 A1* 2/2009 Wagener ................ A61L 31/10
424/641

FOREIGN PATENT DOCUMENTS

| DE | 103 53 756 A1 | 6/2005 |
| DE | 10 2016 104 130 A1 | 9/2017 |
| WO | 2005/048708 A1 | 6/2005 |
| WO | 2005/049699 A2 | 6/2005 |
| WO | 2009/121970 A2 | 10/2009 |
| WO | 2012/004364 A1 | 1/2012 |
| WO | 2012/035322 A2 | 3/2012 |
| WO | 2013/021409 A1 | 2/2013 |
| WO | 2017/162502 A1 | 9/2017 |

OTHER PUBLICATIONS

Yasuda et al.: Units of Gas Permeability Constants, Journal of Applied Polymer Science, vol. 19, 2529-2536 (1975) (Year: 1975).*
Nikkola: Smart multifunctional hybrid coatings with adjustable permeability for migration barriers, https://www.sciencedirect.com/topics/materials-science/plasma-deposition#:~:text=There%20are%20two%20general%20types,complete%20decomposition%20of%20the%20precursor (Year: 2016).*
International Search Report of the International Search Authority, mailed on Feb. 4, 2019, from related PCT/EP2018/085470, filed on Dec. 18, 2018.

* cited by examiner

*Primary Examiner* — Hong Yu
(74) *Attorney, Agent, or Firm* — Verrill Dana, LLP

(57) ABSTRACT

The invention relates to an antimicrobial layer material comprising a layer with a particulate biocidal active ingredient and, on top of that, a layer as transport control layer, wherein the transport control layer is depositable or has been deposited in an afterglow PE-CVD method. The invention further relates to a substrate coated with such an antimicrobial layer material, to the use of a plasma-polymeric layer deposited in an afterglow PE-CVD method as transport control layer for a particulate biocidal active ingredient, and to a method of producing an antimicrobial layer material and to a method of producing a substrate comprising an antimicrobial layer material.

11 Claims, No Drawings

ANTIMICROBIAL LAYERED MATERIAL

The invention relates to an antimicrobial layer material comprising a layer with a particulate biocidal active ingredient and, on top of that, a layer as transport control layer, wherein the transport control layer is depositable or has been deposited in an afterglow PE-CVD method. The invention further relates to a substrate coated with such an antimicrobial layer material, to the use of a plasma-polymeric layer deposited in an afterglow PE-CVD method as transport control layer for a particulate biocidal active ingredient, and to a method of producing an antimicrobial layer material and to a method of producing a substrate with an antimicrobial layer material.

There is a constant need in the prior art to optimize antibacterial coatings for various demands. The crucial standard for antibacterial tests is that according to standards ASTM E 2149, JIS Z 2801/ISO 22196 and JIS L 1902/ISO 20743. In order to be able to pass these tests successfully, biocide release has to be adjusted via the properties of the transport control layer.

DE 103 53 756 A1 discloses a layer material comprising a particulate silver layer. However, the release properties here have not been sufficiently developed particularly for applications that require improved release at an early juncture.

Against this background, it was an object of the present invention to specify an antimicrobial layer material that has been improved with regard to its release properties, especially at an early juncture in its use.

This object is achieved in accordance with the invention by an antimicrobial layer material comprising a layer with a particulate biocidal active ingredient and, on top of that, a plasma-polymeric layer as transport control layer, wherein the transport control layer is depositable or has been deposited in an afterglow PE-CVD method.

It has been found that, surprisingly, transport control layers that have been deposited in an afterglow method have particularly favorable release properties. According to the invention, in an afterglow method, the substrate is positioned in a parallel plate reactor fora PE-CVD method (plasma-enhanced chemical vapor deposition method) in such a way that the distance between substrate and plasma electrode is at least thirty times the dark space zone. The dark space zone is the cathode trap in which the plasma potential drops to the cathode potential.

An active ingredient is biocidal in the context of the present application when this active ingredient has an antibacterial action within the meaning of JIS Z 2801/ISO 22196, i.e., especially under the conditions described therein for antibacterial surfaces, has a reduction in bacteria at least by a factor of 100, but it is preferable that a biocide in the context of this invention has a reduction in bacteria by at least a factor of 1000 under the same conditions.

A biocidal active ingredient is in particulate form when it does not form a continuous layer, but is present in distinct, mutually delimitable particles or particle agglomerations.

Preference is given to a layer material of the invention wherein the transport control layer has a layer thickness of $\leq 320$ nm, preferably $\leq 160$ nm and more preferably $\leq 80$ nm, and/or of $\geq 5$ nm, preferably $\geq 20$ nm.

The respective lower limit or the preferred upper limit here is combinable with every individual one of the upper limits. It is even more preferable here that the antimicrobial layer material comprises a transport control layer having a layer thickness of 20 to 35 nm.

In the preferred layer thickness ranges, very particularly in the particularly preferred layer thickness ranges, the transport control layer for use in accordance with the invention ensures a particularly good release profile.

Preference is given to a transport control layer for use in accordance with the invention that has a base material that is selected from the group consisting of plasma-polymeric layers comprising the elements Si, O, C, Ti, Al, N and/or H, it being further preferable that the plasma-polymeric layer consists exclusively of these elements, although it will be appreciated that not all the elements mentioned must be present.

It is preferable that the transport control layer has a silicon content of 20 to 60 atom % and/or a carbon content of 10 to 30 atom % and/or an oxygen content of 30 to 50 atom %, based in each case on the total number of all atoms measurable by XPs, i.e. especially excluding hydrogen.

It is particularly preferable in this connection that the transport control layer consists of carbon, oxygen, silicon and hydrogen, it being most preferable that the proportion of the elements, carbon, silicon and oxygen is within the aforementioned ranges.

Preference is given to an antimicrobial layer material wherein the particulate biocidal material has a limiting size of $\leq 100$ nm, preferably $\leq 50$ nm, further preferably $\leq 20$ nm, where the limiting size is that particle size above 95% of the particles.

In this case, in the context of the present text, the particle size, in the case of doubt, is determined as described in Measurement example 1 (see below).

It has been found that, surprisingly, the particulate biocidal material with the preferred limiting sizes of $\leq 80$ nm, preferably $\leq 25$ nm, further preferably $\leq 15$ nm has, where the limiting size is that particle size above 95% of the particles.

Preference is given to an antimicrobial layer material of the invention where the ratio of layer thickness of the transport control layer to limiting size of the particles is $\geq 1.4$, preferably $\geq 10$. It has been found that, surprisingly, the ratio of the thickness of the transport control layer to the limiting size of the biocide particles for the desired release profile can make a considerable positive contribution.

Preferably in accordance with the invention, the biocidal active ingredient is silver, copper or zinc or an organic biocide. Particular preference is given to silver and copper, and greatest preference to silver.

The preferred metallic biocides may preferably be applied here by PVD methods, especially by sputtering or vapor deposition. The prior art discloses a multitude of methods of production of particulate organic biocides. For example, it is possible to deposit quaternary ammonium compounds in particulate form from gas phases, but wet-chemical methods are also available. A preferred method for the deposition of particulate, especially organic, biocides is inkjet printing. Preferred organic biocides for use in accordance with the invention are quaternary ammonium compounds (e.g. methacrylamidopropyltrimethylammonium chloride) and quaternary phosphonium compounds.

Preference is given in accordance with the invention to an antimicrobial layer material wherein the concentration of the biocidal active ingredient is 0.3-10 $\mu g/cm^2$, preferably 0.5-5 $\mu g/cm^2$ and further preferably 1-4 $\mu g/cm^2$. These concentrations are especially applicable to the metallic biocides and very particularly to silver as biocide.

The area concentration of the biocidal active ingredient, in the case of doubt, is determined here in top view, i.e. vertically from above. If there is more than one distinct layer with a particulate biocidal active ingredient, the area concentration is determined separately for each of these layers. In other words, no summation of the concentration of the biocidal active ingredient over multiple layers takes place in the case of multilayer systems having more than one biocidal layer.

The preferred layer concentrations assist the desired release profile.

Preference is given in accordance with the invention to an antimicrobial layer material wherein the plasma-polymeric layer consists to an extent of at least 95 atom % each of the elements Ti, O and C or of the elements Si, O, N and C, preferably of the elements Si, O and C, based on the number of atoms determined by XPS.

Preference is given in accordance with the invention to an antimicrobial layer material of the invention wherein the transport control layer has an $O_2$ permeability of $\geq 1000$ cm$^3$/(day*bar).

The determination of the $O_2$ permeability, in the case of doubt, is performed as described in Measurement example 2.

The oxygen permeability of the preferred antimicrobial layer material demonstrates a particularly good release profile. It should be noted here that the feature of oxygen permeability on its own is not sufficient evidence as to whether or not a transport control layer has a desired release profile. Instead, there must be further additional features, for instance in the present case particularly the layer construction that can be generated by the afterglow method.

Further preferred in accordance with the invention is an antimicrobial layer material wherein a 50% $H_2O_2$ solution at 25° C. decolorizes the layer within 12 hours, preferably within 8 hours, further preferably within 6 hours.

It will be apparent that the decolorizing of the layer material is dependent on the thickness of the layers, especially the outer layer. It has been found experimentally that the decolorization time, with rising transport control layer thickness, rises not in a linear but in an approximately exponential manner. It is a feature of a transport control layer for use in accordance with the invention ("depositable or deposited in an afterglow PE-CVD") that it (for a given composition of the transport control layer), with a thickness of 40 nm, is completely decolorized within $\leq 25$ minutes, preferably $\leq 20$ minutes, further preferably $\leq 15$ minutes, even further preferably $\leq 10$ minutes and more preferably $\leq 5$ minutes. Merely for the sake of completeness, it should be mentioned that, in the case of doubt, the substrate on which these decolorization tests are conducted is glass.

Decolorization can be identified under the conditions of Measurement example 3, choosing variant 1 in the case of doubt.

In the context of the present invention, a sample is considered to have been decolorized when it meets the decolorization conditions of Measurement example 3. In an analogous manner to that for metallic biocides, it is also possible to monitor the removal of an organic biocide from the layer by spectral means.

The decolorization of the preferably silver-containing layer material of the invention by the appropriate $H_2O_2$ solution is a good indication that the transport control layer is indeed one to be used in accordance with the invention. The preferred decolorization results mentioned can only be achieved when a coating produced or producible by the afterglow method is present in combination with the biocides for use in accordance with the invention. This is because the transport control layer for use in accordance with the invention assures sufficient accessibility of the decolorizing material to the samples.

Preference is given in accordance with the invention to an antimicrobial layer material of the invention, wherein the transport control layer, after deposition and prior to any activation, has a surface energy of $\leq 48$ mN/m, measured with test inks from Acrotec GmbH to ISO 8296.

The corresponding surface energy is preferably $\leq 40$ mN/m.

Preference is given in accordance with the invention to an antimicrobial layer material of the invention, wherein a (further) layer is provided on the side of the biocide layer remote from the transport control layer, preferably in a configuration as defined for the transport control layer in any of the preceding claims.

This additional layer should be provided on the side of the transport control layer facing the substrate. It may firstly be used for adhesion promotion, but may secondly also serve, for example, to alleviate or rule out adverse effects of the substrate on the biocide or the release of the biocide. Such an adverse effect could, for example, be unwanted redox pair formation. In addition, the preliminary coating can be used to adjust the surface energy of the underlayer.

It is left to the person skilled in the art to configure this additional layer for the desired effect. In many cases—and this is preferable—an embodiment as defined above for the transport control layer is suitable for this additional layer, especially in preferred embodiments. The transport control layer here need not necessarily have the same composition as the additional layer, but it is preferable in some cases to use the same layer from deposition conditions.

In many cases, it may be preferable in accordance with the invention that the antimicrobial layer material of the invention comprises more than one biocidal active ingredient layer. The construction of this further active ingredient layer may be the same as that of the one used in accordance with the invention, but may also be different, according to the purpose of its use. However, it is preferable to use multiple biocide layers to be used in accordance with the invention and having a particulate biocidal active ingredient, as defined above, one on top of another, in which case it is apparent that these biocide layers are separated from one another, preferably by a transport control layer, further preferably likewise in one of the forms to be used in accordance with the invention which is identified above as being preferred.

With the aid of the "multilayer" biocide layers, additional release profiles can be established in an excellent manner. This is especially true if rapid release is desired on the one hand, but also on the other hand if release over a maximum period of time is required.

Also part of the invention is a substrate having an antimicrobial layer material of the invention. The substrate of the invention here may be partly or fully coated with the antimicrobial layer material of the invention. It is preferable that the substrate is coated with the antimicrobial layer material of the invention at least in the region in which it potentially comes into contact with microbes if it is being used as intended.

It is preferable in accordance with the invention that the substrate of the invention with the antimicrobial layer material of the invention is selected from the group consisting of medical products for human and/or veterinary medicine applications, hygiene products and packaging material.

Medical products are especially catheters, wound dressings, wound coverings, contact lenses, implants, such as medical nails, screws, bone fixation nails, dental implants, hip implants, knee implants, implants for fixing on the spinal column, vessel implants and merely temporary implants, and medical instruments. These explicitly also include implants and instruments for use in the veterinary medical sector.

Hygiene products are especially napkins and diapers.

Packaging material may especially serve for medical or hygiene products.

Substrates of the invention may also be components for production or processing of foods. Also useful are coatings for other products where exceptional hygiene is required.

On the substrates of the invention, especially on those that are preferred, the release profile enabled by the antimicrobial layer material of the invention is found to be particularly helpful.

Also part of the invention is the use of a plasma-polymeric layer for use in accordance with the invention as defined above as transport control layer for a particulate biocidal active ingredient.

Also part of the invention is a method of producing an antimicrobial layer material of the invention, comprising the steps of:
 a) depositing a particulate biocidal layer to be used in accordance with the invention, as defined further up, and
 b) after step a) depositing a plasma-polymeric transport control layer in an afterglow CVD method, wherein the transport control layer is preferably configured as defined above.

Also part of the invention is a method of producing a substrate of the invention with an antimicrobial layer material, comprise the steps of:
 a) providing a substrate and
 b) depositing an antimicrobial layer material on the substrate in a method of the invention as described above for production of an antimicrobial layer material.

The methods of the invention, especially in the preferred configurations, very particularly with the preferred materials, can be used to produce antimicrobial layer material or antimicrobially coated substrates that have an excellent product-specific release profile. These substrates of the invention (by means of the antimicrobial layer materials of the invention) can fulfill the abovementioned standards without difficulty.

EXAMPLES

Measurement Example 1

Determination of Particle Size:

An FIB section (focused ion beam preparation) with subsequent TEM imaging (transmission electron microscopy) of the sample to be analyzed is created, image detail of 100 nm×100 nm (size of the image about 500×500 nm). Standard method: particles, especially silver particles, can be seen as a layer in the FIB-TEM image covered by the transport control layer.

With appropriate magnification (120 000 to 150 000-fold), only those particles that are fully covered by the transport control layer and reach through to the silver layer (PVD layer) are assessed.

Particles that visibly project from the transport control layer are not evaluated.

In the image detail, appropriate particles are marked and measured by the greatest particle diameter (longitudinal axis). Particles are sorted by size. The particle size of the largest particle marked in the image detail, if appropriate, is fixed as reference parameter.

Special case: biocide particles are the only particles visibly resolved in the FIB-TEM image.

Individual particles are measured here in the FIGURE. An image detail of 200×200 nm is fixed: the resolution should be chosen such that the lattice planes of the silver particles are shown as streaks/haze in the particles. In this section, the largest particles apparent are identified and, among these, the particles having the greatest particle diameter apparent (longitudinal axis) are ascertained. Particles having significant constrictions (narrowing of more than 30% in the transverse axis) are considered to be separate particles. This particle diameter is fixed to take account of the particle size.

Measurement Example 2

Measurement of Oxygen Permeation

Oxygen permeation was measured using the OX-TRAN 2/20 instrument from Mocon, USA. The transport control layer was deposited on a polypropylene film of size 10 cm×10 cm with a thickness of 100 μm. Prior to the measurement, the film was stuck to an aluminum foil screen having a 5 cm² opening, such that the measurement surface is reduced by a factor of 10. The permeation value measured by the instrument therefore has to be multiplied by a factor of 10. In order to determine the permeation value of the coating, the following formula is employed:

$$Qs=Qg*Qf/(Qf-Qg)$$

where Qg=permeation value of the coated film,
 Qf=permeation value of the uncoated film and
 Qs=permeation value of the layer.

The permeation value Qf for oxygen of the uncoated film is 2341 cm³/(day*bar) at humidity of 0%. The exact measurement operation can be found in Chapter 8 "Testing Flat Film Samples" in the Operator's Manual of the instrument from Mocon, Minneapolis, USA. If the measurement for the coated film is Qg 1035 cm³/(day*bar), a permeation value of the coating Qs on the polypropylene film of 1855 cm³/(day*bar) is calculated.

Measurement Example 3

Decolorization

The determination is effected at room temperature, 25° C. The biocide for this test is preferably particulate silver. The coating is examined with 50% hydrogen peroxide.

A sample is preferably covered with at least 1 cm³ of 50% $H_2O_2$ per cm² of layer by dipping.

This ensures that peroxide is supplied in excess in each case.

Variant 1 (preferred): for comparative purposes, an identical coating without deposited biocide is used, especially silver: this describes a decolorized layer under otherwise identical deposition conditions.

Variant 2 (simplified): an uncoated sample is used for comparative purposes.

Variant 3: an identical sample that has been produced via treatment with 50% $H_2O_2$ over at least 12 hours is used for comparative purposes.

Decolorization: the sample is decolorized in hydrogen peroxide; the decolorization of the sample is monitored by spectral means (UV-VIS reflection spectroscopy in the case of nontransparent samples; UV-VIS spectroscopy in the case of transparent samples) in the wavelength range from 320 nm to 780 nm.

A sample is considered to be decolorized when:
 its spectrum (absorbance) is altered by the peroxide treatment and the spectrum of the sample to be examined is approximated to the reference spectrum to an extent of at least 90% by the treatment with peroxide. This is considered to have been achieved when the optical absorption constant k of the decolorized sample in the wavelength range from 300 to 500 nm has a differential from the reference of ≥0.01.

The time required for decolorization is registered. The upper limit for the recording of time is considered to be 12 h.

In the comparison by FIB-TEM imaging (see particle size) between non-decolorized and decolorized sample, the "decolorization" is correlated with the removal of the biocide particles. On completion of decolorization, not more than 10% of the particles originally present may be detectable as being incorporated within the coating in the above-described FIB-TEM image.

Coating Examples

Plasma System Used:

The PA9 plasma system has a capacity of 346 l and works with a high-frequency plasma discharge (13.56 MHz). The plasma electrode (400 mm×200×1 mm) has a distance from the back wall of 6.5 cm. the substrates are disposed at a given distance (table 2) at the same height of the plasma electrode. The working gases are admitted into the reactor from the top (height=76 cm, width=68 cm, depth=67 cm). The pump flange is at the bottom and in the middle of the reactor. The pumping unit consists of a 1200 m³/h roots pump and an 80 m³/h backing pump. The pump output in the reactor is about 1000 m³/h at a working pressure of 0.02 mbar.

Experiment Description

The substrates (glass, Al-metallized PET film and silicon wafer) are fixed at a given separation on an aluminum block. The Al block itself is at floating potential. The layer thickness or rate is determined on the silicon wafer by reflectometry, and the permeability of the layers in an $H_2O_2$ solution (50%, RT). The glass substrates or the metallized PET film (80 nm Al on 50 μm PET film) have been precoated with an $SiO_xC_yH_z$ layer (deposited as described for the "preliminary coating" in table 1) and sputtered with silver.

The metallic silver particles are deposited (sputtered) in the same reactor by HF magnetron sputtering. The magnetron has a diameter of 250 mm. The target material used is metallic silver (purity: 99.99%). Once the base pressure of $3*10^{-3}$ mbar has been attained, argon is introduced into the chamber as working gas at a flow rate of 100 sscm. The sputtering output is 450 W. A separation of 50 cm of target and substrate is chosen. After a process duration of 180 seconds, silver particles having a diameter of less than 100 nm and a concentration of 2 μg/cm² are formed on the substrate.

The transport control layer as described in table 1 is deposited onto the particulate silver layer (about 2 μg/cm²) without activation.

TABLE 1

Gas flow rates, plasma power and process pressures for production of the transport control layers

| | Preliminary coating | | Transport control layer | |
|---|---|---|---|---|
| | Activation | Deposition | Deposition | Activation |
| $O_2$ [sccm] | 100 | 100 | 100 | 100 |
| HMDSO [sccm] | 0 | 10 | 5 | 0 |
| Power [W] | 160 | 160 | 160 | 160 |
| Time [s] | 120 | 120 | Table 2 | 300 |
| Pressure [mbar] | 0.020 | 0.025 | 0.023 | 0.02 |

The size of the silver particles was determined by transmission electron microscopy (TEM). The diameter of the silver particles is about 15 nm. The color of the coating is red-yellow on the glass substrates and red-gold on the metallized PET film.

A variation in separation was conducted in order to determine the effect of the plasma electrode-substrate separation on permeability. It is clearly apparent from table 2 that a high distance leads to more porous (afterglow) layers since the decolorization time decreases significantly with increasing separation.

Table 2

| Process number | Separation [cm] | Thickness [nm] | Time [s] | Rate [nm/s] | Decolorization time [min] | Surface energy prior to layer activation [mN/m] |
|---|---|---|---|---|---|---|
| 3857 | 5.0 | 48 | 165 | 0.29 | >180 | 48 |
| 3862 | 7.5 | 47 | 145 | 0.32 | 120 | 48 |
| 3869 | 10.0 | 42 | 120 | 0.35 | 30 | 48 |
| 3870 | 35.0 | 42 | 345 | 0.13 | 2 | 38 |
| 3855 | 50.0 | 45 | 540 | 0.08 | 0.3 | 38 |
| Comparative layer syton | | 45 | 45 | 1.00 | >180 min | 105 |

Comparative layer syton corresponds to example 1 from WO 2005/048708 A2, with additional application of a sublayer that has been deposited in the same way as the transport control layer from example 1 to the substrate.

In conclusion, it is found that, compared to the prior art and to layers that have not been deposited by the afterglow method, the decolorization times of the layer system of the invention are much shorter. This is an indication of a preferred release profile enabled by the layers to be used in accordance with the invention.

The invention claimed is:

1. An antimicrobial layer material comprising:
   a biocide layer with a particulate biocidal active ingredient; and
   a plasma-polymeric layer as a transport control layer disposed upon the biocide layer;
   wherein the antimicrobial layer material includes the biocide layer including a sputtered metallic silver layer having a plurality of silver particles, wherein for over 95% of the plurality of particles, each of the plurality of particles has a limiting size of ≤80 nm, and the plasma-polymeric layer including a transport control layer disposed thereon, the transport control layer having a thickness in a range of ≥5 nm and ≤320 nm, and a ratio of a thickness of the transport control layer to the limiting size of ≥1.4, the transport control layer being generated in an afterglow plasma enhanced-chemical vapor deposition (PE-CVD) method, the after-glow PE-CVD method including a substrate being placed in a parallel-plate reactor for the after-glow PE-CVD method such that a distance between the substrate and a plasma electrode is at least thirty times a dark space zone, and wherein the dark space zone is a cathode trap in which a plasma potential drops to a cathode potential;

wherein the transport control layer has a layer construction characterized by a release property;

wherein the release property is characterized by a decolorization feature which is correlated with a decolorization time of ≤25 minutes per a thickness of the transport control layer of 40 nm when a sample including the antimicrobial layer disposed on a substrate is subjected to a $H_2O_2$ treatment;

wherein the $H_2O_2$ treatment includes covering the transport control layer of the sample with at least 1 cm$^3$ of 50% $H_2O_2$ solution per cm$^2$ of the transport control layer;

wherein the decolorization time corresponds to a time duration required for an absorption constant of the sample in a wavelength range of 300 nm to 500 nm to have a differential of 0.01 relative to a reference sample including the substrate and the plasma-polymeric layer deposited directly on the substrate without the biocide layer;

wherein the particulate biocidal active ingredient is selected from the group consisting of silver, copper, and zinc; and wherein the plasma-polymeric layer consists of at least 95 atom % of elements being selected from a group of elements consisting of Ti, O and C; Si, O, C and N; and Si, O and C, based on a total number of atoms determined by XPS.

2. The antimicrobial layer material as claimed in claim 1, wherein a concentration of the particulate biocidal active ingredient is 0.3-10 µg/cm$^2$.

3. The antimicrobial layer material as claimed in claim 1, wherein a layer is provided on a side of the biocide layer remote from the transport control layer.

4. The antimicrobial layer material as claimed in claim 1,
wherein the transport control layer is generated in an afterglow plasma enhanced-chemical vapor deposition (PE-CVD) method;
wherein the after-glow PE-CVD method includes a substrate being placed in a parallel-plate reactor for the after-glow PE-CVD method such that a distance between the substrate and a plasma electrode is at least thirty times a dark space zone; and
wherein the dark space zone is a cathode trap in which a plasma potential drops to a cathode potential.

5. A substrate comprising the antimicrobial layer material as claimed in claim 1.

6. The substrate as claimed in claim 5, wherein the substrate comprises a product selected from the group consisting of a product for human application, a product for veterinary application, and a combination of the two aforementioned.

7. A method of use of the plasma-polymeric layer as claimed in claim 1 as the transport control layer for the particulate biocidal active ingredient.

8. A method of producing the antimicrobial layer material as claimed in claim 1 comprising the steps of:
a) depositing the particulate biocidal layer; and
b) after step a), depositing the plasma-polymeric transport control layer in an afterglow PE-CVD method.

9. A method of producing a substrate comprising the antimicrobial layer material as claimed in claim 1, comprising the steps of:
a) providing the substrate; and
b) depositing the antimicrobial layer material onto the substrate.

10. The substrate as claimed in claim 5, wherein the substrate comprises a product selected from the group consisting of an implant, a wound dressing, hygiene product and a packaging material.

11. The substrate as claimed in claim 5, wherein the substrate comprises a medical product.

* * * * *